(12) United States Patent
Neumann et al.

(10) Patent No.: US 10,001,550 B2
(45) Date of Patent: Jun. 19, 2018

(54) METHOD FOR AUTOMATIC CLASSIFICATION OF RADAR OBJECTS

(71) Applicant: AIRBUS DS ELECTRONICS AND BORDER SECURITY GMBH, Taufkirchen (DE)

(72) Inventors: Christoph Neumann, Beimerstetten (DE); Hermine Senkowski, Neu-Ulm/Burlafingen (DE)

(73) Assignee: AIRBUS DS ELECTRONICS AND BORDER SECURITY GMBH, Taufkirchen (DE)

( * ) Notice: Subject to any disclaimer, the term of this patent is extended or adjusted under 35 U.S.C. 154(b) by 254 days.

(21) Appl. No.: 15/198,233

(22) Filed: Jun. 30, 2016

(65) Prior Publication Data

US 2017/0003378 A1    Jan. 5, 2017

(30) Foreign Application Priority Data

Jul. 1, 2015    (DE) .......................... 10 2015 008 403

(51) Int. Cl.
*G01S 7/41* (2006.01)
*G01S 13/52* (2006.01)
(Continued)

(52) U.S. Cl.
CPC ................ *G01S 7/414* (2013.01); *G01S 7/41* (2013.01); *G01S 13/52* (2013.01); *G01S 13/66* (2013.01)

(58) Field of Classification Search
CPC . G01S 7/414; G01S 13/66; G01S 7/41; G01S 13/52; G01S 13/53; G01S 13/58; G01S 13/584; G01S 13/726
See application file for complete search history.

(56) References Cited

U.S. PATENT DOCUMENTS 4,887,088 A * 12/1989 Beckett ................ G01S 13/584
                                                        342/128
5,748,140 A *  5/1998 Schober ............... G01S 13/726
                                                        342/140
(Continued)

FOREIGN PATENT DOCUMENTS

EP    0034125 A1    8/1981
EP    0059998 A1    9/1982

OTHER PUBLICATIONS

European Search Report dated Nov. 22, 2016 in related EP Application No. 16001346.2.
(Continued)

*Primary Examiner* — Bernarr E Gregory
(74) *Attorney, Agent, or Firm* — Patent Portfolio Builders PLLC

(57) ABSTRACT

Classification of radar objects involves processing a received radar signal in an input channel within a number of successive coherent integration intervals (bursts), detecting an object using Doppler filter amplitudes, and producing range reports. A number of range reports are combined using a cluster algorithm to form a plot, and adding Doppler filter amplitudes of the two azimuthally adjacent bursts from the same range cell each range report. As subset of the range reports is formed by, starting with the range report at the position of a plot centroid, arranging range reports from a defined number of bursts sorted according to azimuthal position in a matrix of the dimension azimuth x range with the plot centroid in the center. Doppler filter amplitudes from the region plot centroid +– a defined number of bursts associated with the range reports are arranged according to the burst sequence. A combined plot spectrum is formed as a vector of range reports from the matrix, which is initiated with the range cell of the plot centroid and then the next nearest range report in adjacent range cells is inserted at all (Continued)

burst positions at which there is no range report in the range cell. Remaining gaps are filled with the adjacent Doppler filter amplitudes of the range reports used and then gaps still remaining are filled with a suitable noise value.

7 Claims, 3 Drawing Sheets

(51) Int. Cl.
*G01S 13/66* (2006.01)
*G01S 13/00* (2006.01)

(56) References Cited

U.S. PATENT DOCUMENTS

| | | | |
|---|---|---|---|
| 6,307,500 B1* | 10/2001 | Cornman | G01S 13/58 342/26 R |
| 6,677,886 B1 | 1/2004 | Lok | |
| 6,809,682 B1* | 10/2004 | Madewell | G01S 13/53 342/159 |

OTHER PUBLICATIONS

German Search Report dated Jan. 22, 2016 in related DE Application No. 10 2015 008 403.8.

* cited by examiner

Fig. 1
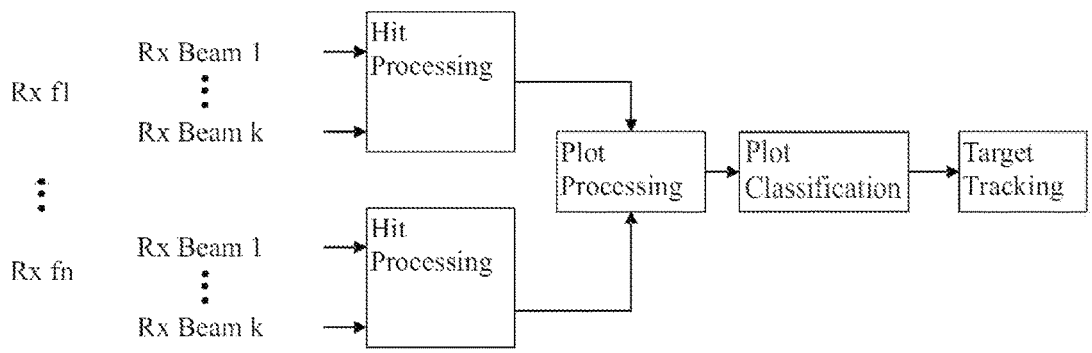
Fig. 2
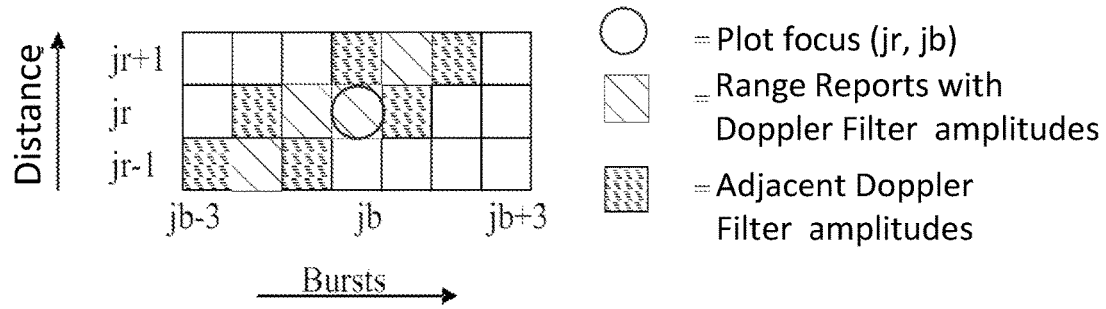
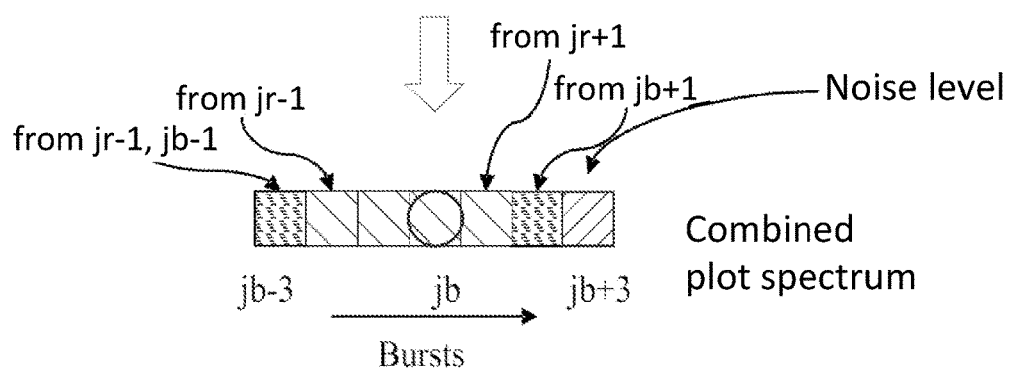

METHOD FOR AUTOMATIC CLASSIFICATION OF RADAR OBJECTS

CROSS-REFERENCE TO RELATED APPLICATIONS

This application claims priority under 35 USC § 119 to German application 10 2015 008 403.8, filed on Jul. 1, 2015, the entire content of which is herein expressly incorporated by reference.

BACKGROUND AND SUMMARY OF THE INVENTION

Exemplary embodiments of the invention are directed to a method for the automatic classification of radar objects by a cluster algorithm for combining a number of object detections, so-called range reports, from successive, coherent integration intervals (also known as bursts).

Signature classification of radar objects is sufficiently known in the prior art and is used in radar technology to reduce false detections and errors in following targets, the so-called tracking. For this purpose, a reception signal is usually processed in an input channel of the radar within a number of successive coherent integration intervals, i.e. bursts, and an object detection is processed using single detections per burst by feeding the same according to the "geometric affiliation" criterion to a cluster algorithm for forming a plot. The single detection is frequently carried out on the radar signal in a two-dimensional matrix in the range Doppler plane, therefore the detections are referred to below as "range reports". This term is synonymous here for exceeding the threshold value of the signal level in the range Doppler matrix, wherein it is assumed that the radar provides a defined resolution in the "range" dimension.

In the "Doppler" dimension, likewise a defined resolution by the radar is assumed; the individual resolution cells are referred to below as "Doppler filters". The contents of the Doppler filters are the level of each range cell sorted according to the frequency shift of the radar echo signal. In this case the Doppler filters correspond to different radial speeds of a reflective object. The detection of objects (for example of a helicopter or similar) using the echo signal thereof in the Doppler filters is also a conventional method. In the following, a plot means the output of a detected object, wherein the coordinates of the plot are formed from the centroid of the addresses of the cluster in the coordinate system of the radar measurement (i.e. for example range, Doppler, azimuth). The centroid is referred to below as a plot centroid. The plots are usually input information for the target following ("tracking"), i.e. for the algorithm that tracks the objects against time and, for example, displays this to an observer.

U.S. Pat. No. 6,677,886 is an example of the techniques discussed above and describes a method for the classification of radar objects using Doppler filter amplitudes, wherein range reports are produced and the range reports are combined using a cluster algorithm to form a plot, wherein confidence factors are used to determine whether a cluster represents a real aircraft or a false target.

By incorporating known environmental information as well as specially adapted and high resolution radars, false detections and errors in the tracking of targets can be resolved to a quality determined by the radar design and the ambient conditions. For relatively low resolution radars with high sensitivity, as widely used in civil airspace monitoring, a particularly high number of false detections (=plots of unwanted objects) is to be expected based on the aforementioned usual method for detecting targets, which is not always compatible with requirements on the radar, in that it results in falsely generated or falsely conducted tracks.

Exemplary embodiments of the present invention is therefore directed to recognizing unwanted objects as such and distinguishing the unwanted objects from the target objects (for example aircraft), using a reliable method for the classification of radar objects for low resolution and at the same time for sensitive radar systems.

According to the invention, the aforementioned method for the classification of radar objects is expanded by adding the Doppler filter amplitudes of the two azimuthally immediately adjacent bursts from the same range cell to each range report;

forming a subset of the received range reports by arranging adjacent range reports from a defined number of bursts sorted according to azimuthal position in a matrix of the dimension azimuth x range with the plot centroid in the center, starting with the range report at the position of the plot centroid;

arranging the Doppler filter amplitudes associated with the range reports from the range plot centroid +/− a defined number of bursts according to the burst sequence; and forming a combined "plot spectrum" as a vector of range reports from the matrix, which is initiated with the range cell of the plot centroid; then the closest range report in adjacent range cells is inserted for all burst positions for which there is no range report in the range cell. Remaining gaps are filled with the adjacent Doppler filter amplitudes of the range report used and then any gaps still remaining are filled with a suitable noise value.

The solution according to the invention has proved especially advantageous compared to the prior art because a useful object classification can be carried out even in economically advantageous low resolution radars. In addition, the invention ensures that the resulting "plot spectrum" contains no spectral components of adjacent objects in the context of the selectivity of the plot formation. It is thus possible to significantly reduce false detections both for the objects themselves as well as for the formation thereof into tracks.

BRIEF DESCRIPTION OF THE DRAWING FIGURES

The invention is described in detail below using the figures. In the figures:

FIG. 1 shows a schematic flow chart of the signal processing;

FIG. 2 shows a basic representation of the method according to the invention;

DETAILED DESCRIPTION

Figure 3:
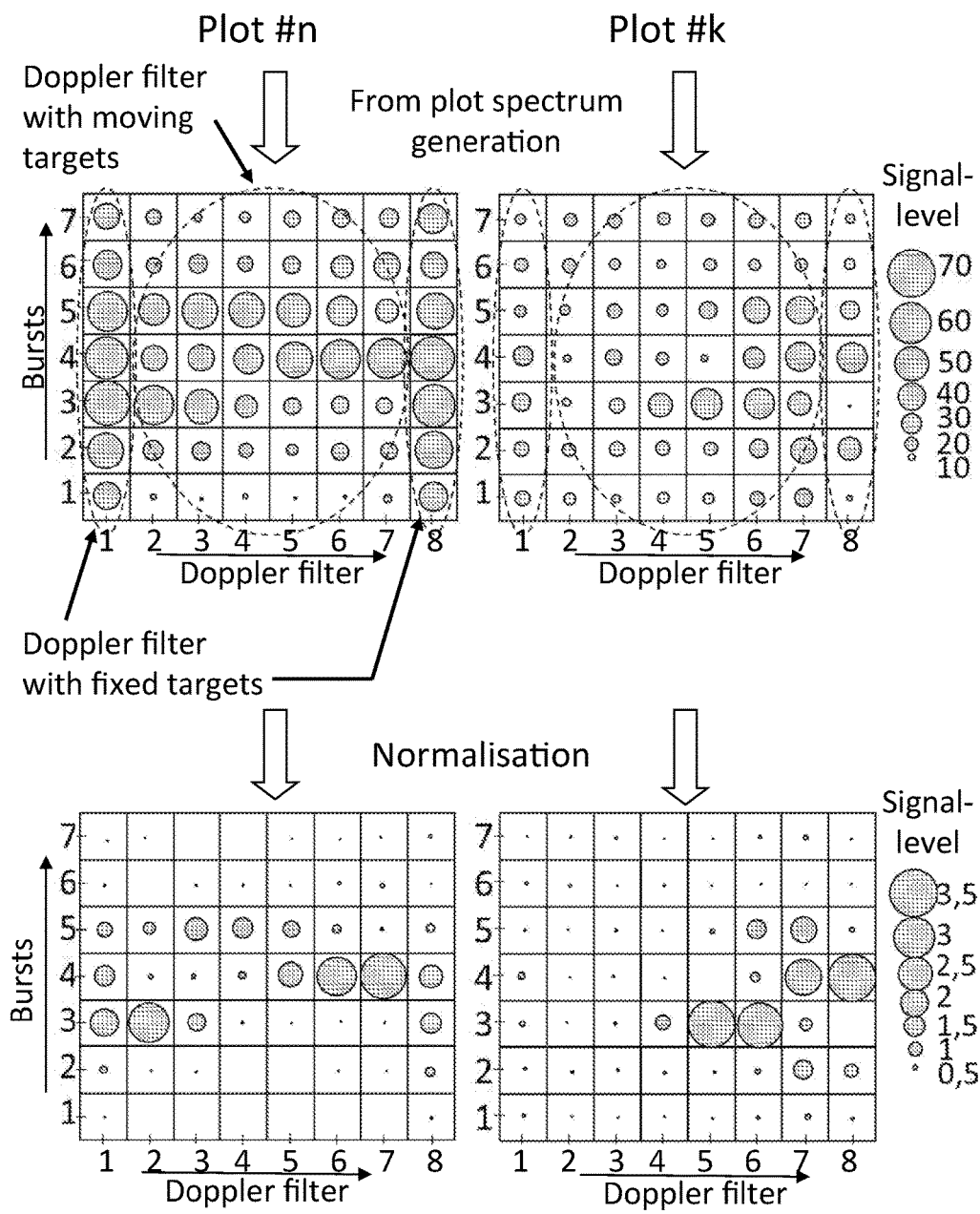
FIG. 3 show a representation of normalization of the Doppler filter amplitudes.

FIG. 1 shows in the manner of a schematic flow chart an excerpt from the signal processing in which the method according to the invention can be used. In this case instances of exceeding the threshold (hits) are first both detected from input channels Rx of one or more radar center frequencies f1 to fn used by using the echo signals of one or a plurality of receiving antennas for the "Beam 1" to "Beam k" as the process step "hit processing" and are further processed to produce plots in the subsequent process step "plot processing". The processing includes, inter alia, the Doppler filtering described above, the hits being output, for example, in the form of the aforementioned range reports, in each case with coordinate information for "range", "azimuth" and "time".

In addition, yet more information will arise during the aforementioned signal processing, which can be used during the plot classification illustrated below, in particular:

Doppler filter amplitude for each Doppler filter of a range report;

Doppler filter amplitude for each time predecessor, i.e. the temporally preceding azimuthal position in the same range;

Doppler filter amplitude for each time successor, i.e. the temporally following azimuthal position in the same range; and Level of the noise background (for example from long-term measurement).

The "plot processing" step provides the detected target positions in the form of clusters of the range reports of all reception channels for generating the aforementioned plot. In this case the plot positions are the centroids of the clusters, i.e. object coordinates in range, azimuth and time.

Besides a common centroid, the plot processing also provides the plot centroids from the range reports of the individual channels for later use in the plot classification, i.e. in this case the reception frequencies f1 fn and/or Beam 1 . . . Beam k, insofar as more channels are available.

The plot classification is followed by target tracking, which obtains all plot information expanded by the result of the plot classification.

The plot classification according to the invention, which is only indicated in FIG. 1 as a process step, is explained below in detail using FIG. 2.

First, additional Doppler filter amplitudes of azimuthally adjacent bursts are combined with each range report, as illustrated in the upper part of the figure. From the range reports combined in this way, the subset that is likewise illustrated in the upper part of the figure is formed by establishing a matrix with the dimensions azimuth and range about the range report at the position of the plot centroid (indicated in the figure with a circle). In the example shown, the matrix comprises Doppler filter amplitudes for three range cells r−1 to r+1 and seven bursts b−3 to b+3. It goes without saying that the dimension selected in the figure is only to be seen as exemplary. The specific dimension of the matrix can be optimally adapted to the radar system used, in particular based on the resolution, antenna characteristic and number of available bursts per illumination period. A single remaining combined plot spectrum is to be generated using the illustrated matrix. For this purpose, a vector is formed of Doppler spectra, with the Doppler filter amplitudes of the plot centroid in the center and including Doppler filter amplitudes from adjacent range reports within the same radial range cell. Then remaining gaps can be filled with Doppler filter amplitudes from spatially adjacent range cells. Further gaps can be populated by existing Doppler filter amplitudes adjacent to the centroid that have not caused the threshold to be exceeded, but still partially contain the target signal. The incorporation of the Doppler filter amplitudes is advantageous in order to further increase the information density. The gaps still remaining following the steps can be filled with realistic noise values. Due to the data set compressed in this way, it is subsequently possible to achieve high quality object classification, even for low resolution radars. Due to the choice of the output in the form of a simple plot spectrum, the method is compatible with the following usual signal processing method of radar technology that is known from the literature.

In order to achieve a qualitative improvement of the subsequent data processing, and in particular to reduce permanent echo effects, the normalization of the Doppler filter amplitudes in the plot spectrum illustrated below using FIG. 3 is carried out.

The normalization can be carried out in an advantageous way specifically on the respective plot spectrum and not in relation to a global predefined value. Thus, an individual normalization is carried out for each plot spectrum. In doing so it is furthermore advantageous to handle radar-specific spectral regions or single frequencies (Doppler filters) separately. Thus, a normalization can be carried out, for example, in relation to the respective average value of the amplitudes or powers of the Doppler filters with higher frequency shifts (moving targets, in the figure the "inner" filter) and the Doppler filters with low or no frequency shift (static targets, in the figure the "outer" filters).

Figure 4:
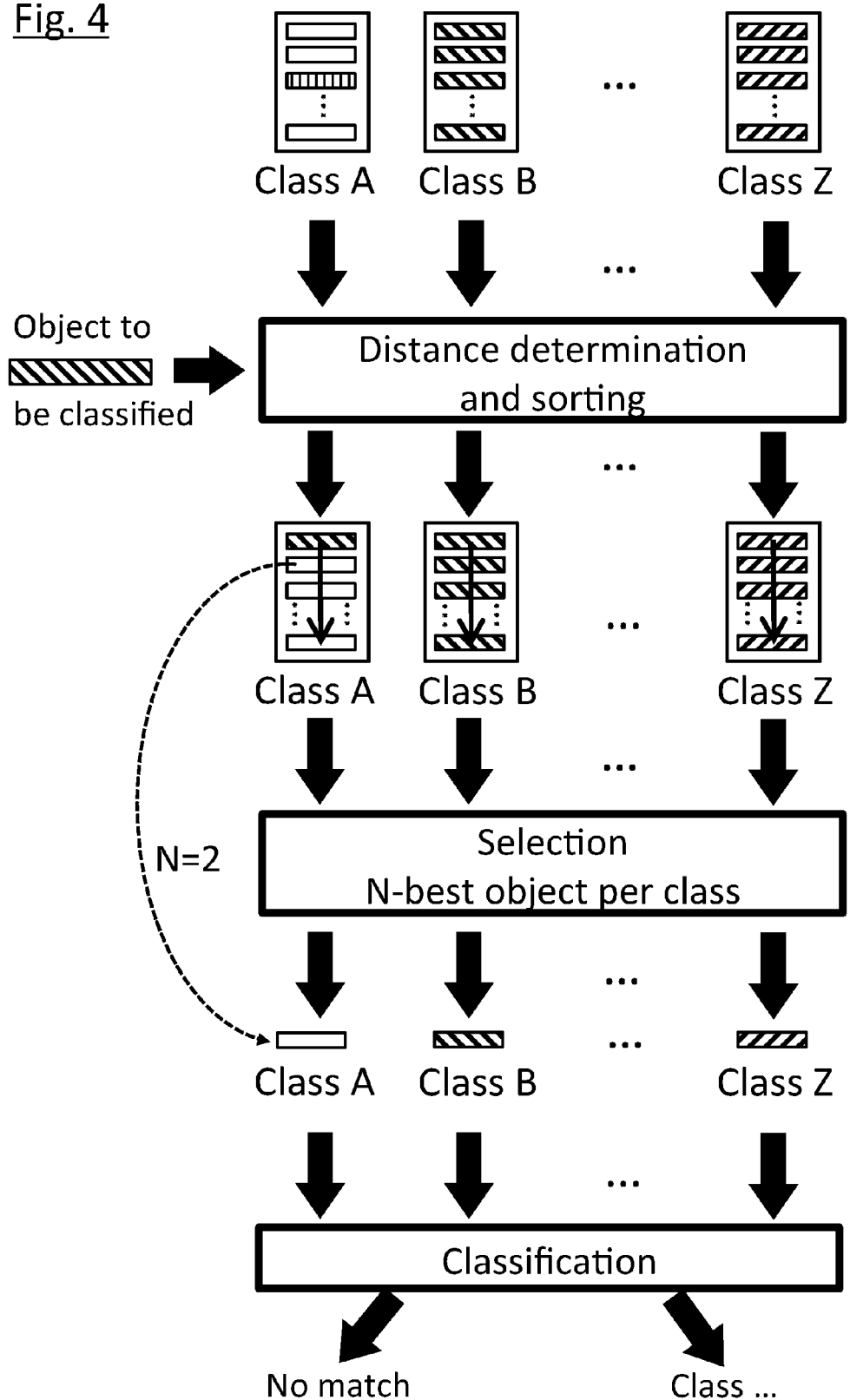
FIG. 4 shows a schematic representation of the classification.

A further advantageous development of the invention, which however does not necessarily have to be preceded by the aforementioned designs, is possible in relation to the object classification. The classification is carried out on a database of a feature determination, for example based on texture or correlation analyses, and has long been known to persons skilled in the art. A special modification of the next nearest classification is provided for the classification, with a training phase that is usual according to the prior art and an application modified according to the invention, illustrated in FIG. 4.

In order to perform the classification, initially the distance $d_{k,l}$ of the feature vector of the object to be classified from all representatives of the defined target classes in a database is determined, i.e.:

$$d_{k,l} = \left( \sum_{i=1}^{N_{feat}} |f - \lambda_{k,l}|^p \right)^{1/p}$$

with $N_{feat}$=length of the feature vector f=real feature vector of the object to be classified $\lambda_{k,l}$=feature vector of the l-th representatives of the class k p=normalization parameter, recommended: p=1 or p=2

Next, the entries within the respective class are sorted according to the distance $d_{k,l}$ thereof from the object to be classified and a predefined rank K (typically a value between 2 and 5) is selected for each object class. Subsequently, for each class k a minimum distance $dmn_k$ is determined according to the selected rank K, i.e.:

$$d_{sort,k} = \text{sort}(d_1 \ldots n_k, k)$$

$$dmn_k = d_{sort}(K)$$

with:

sort( . . . )=sorting ascending by value $N_k$=number of the representatives of the class k K=selected rank<<$N_k$ In contrast to the known "K-Nearest-Neighbour"—classifier, due to the sorting it is not necessary for a decision on a class that the next K distances from all other classes are greater than from the target class upon which it has been decided.

Due to the definable rank, it is possible to mask isolated faulty elements in the class representatives, which arise, for example, due to erroneous associations in the training process. Thus, the detection is not made on the class with K best distances, but on the class for which the K-t best distance is smaller than the K-t bests of all other classes.

With the distance measurements, a normalized quality value $Q_k$ is then calculated for each of the classes k=1 . . . NK (=number of defined target classes), on which the actual selection of the class is ultimately based:

$$q_k = \frac{dmn_k}{\min_{k=1...NK}(dmn_k)}, Q_k = \frac{q_k}{\sum_{i=1...NK} q_i}$$

It can, however, be advantageous to come to the decision "no agreement" if the quality value for two or more classes is less than a predefined distance threshold value.

It goes without saying that the methods described above need not necessarily be implemented in the same radar system. It is quite conceivable for example to use only one of the methods or any sub combination of the methods in a radar system.

Although the present invention has been described above by means of embodiments with reference to the enclosed drawings, it is understood that various changes and developments can be implemented without leaving the scope of the present invention, as it is defined in the enclosed claims.

What is claimed is:

1. A method, comprising:
processing, in an input channel within a number of successive coherent integration intervals, a received radar signal;
performing, using Doppler filter amplitudes, an object detection;
producing range reports;
combining, using a cluster algorithm, a number of range reports to form a plot;
adding Doppler filter amplitudes of two adjacent bursts of the number of successive coherent integration intervals from a same range cell to each range report;
forming a subset of the range reports by, starting with a range report at a position of a plot centroid, arranging adjacent range reports from a defined number of bursts sorted according to azimuthal position in a matrix of a dimension azimuth x range with the plot centroid in a center of the matrix;
arranging the Doppler filter amplitudes associated with the range reports from the region plot centroid +/− a defined number of bursts according to the burst sequence;
forming a combined plot spectrum as a vector of range reports from the matrix, which is initiated with the range cell of the plot centroid;
inserting a next nearest range report in adjacent range cells at all burst positions in a range cell at which there is no range report;
filling remaining gaps with the adjacent Doppler filter amplitudes of the used range report; and
filling any remaining gaps with a noise value.

2. The method of claim 1, further comprising:
normalizing the Doppler filter amplitudes in the combined plot spectrum.

3. The method of claim 2, wherein the normalization is performed on defined regions of the combined plot spectrum.

4. The method of claim 3, wherein the normalization is performed in relation to a respective average value of amplitudes or powers in the defined regions of the combined plot spectrum.

5. The method of claim 1, wherein classification of a detected object involves determining a distance of an object to be classified from all entries of predefined object classes and sorting entries within a respective object class according to the distance from the object to be classified, wherein a predefined rank K is selected for each object class.

6. The method of claim 5, wherein the predefined rank is from 2 to 5.

7. The method of claim 5, further comprising:
calculating a quality value for each object class, wherein a "no agreement" decision is made if the quality value for two or more classes is less than a predefined threshold value.

* * * * *